July 27, 1948.  W. C. TUCKER  2,446,146
WORK GAUGE SUPPORT FOR SHEARS
Filed March 23, 1945  2 Sheets-Sheet 2
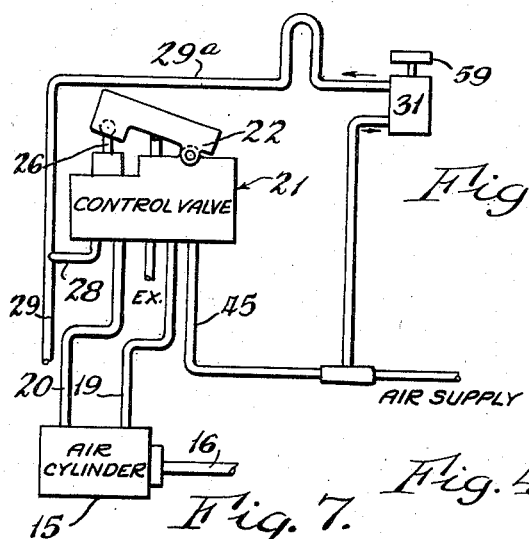
Fig. 3.
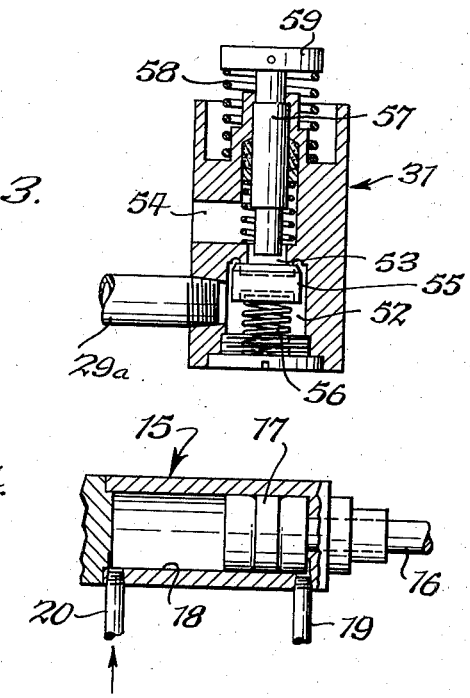
Fig. 4.
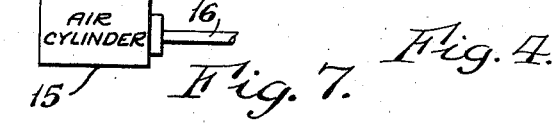
Fig. 7.
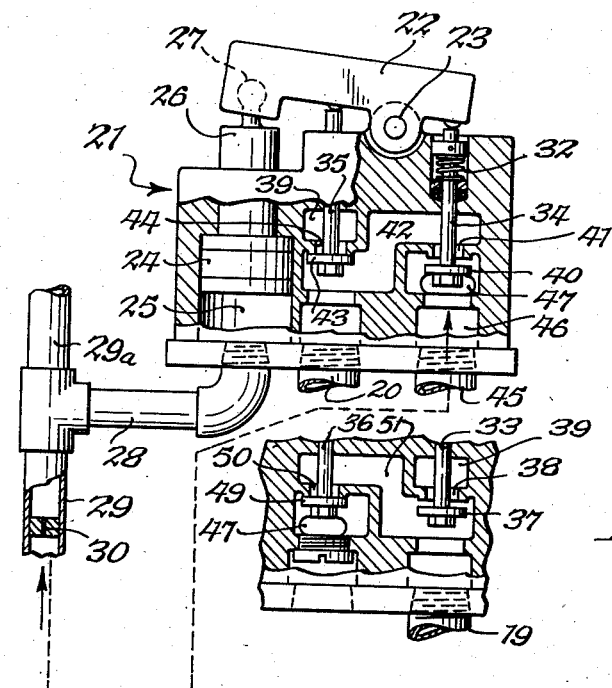
Fig. 5.
Fig. 6.
INVENTOR.
William C. Tucker
BY
Parker, Crochnow & Farmer,
Attorneys.

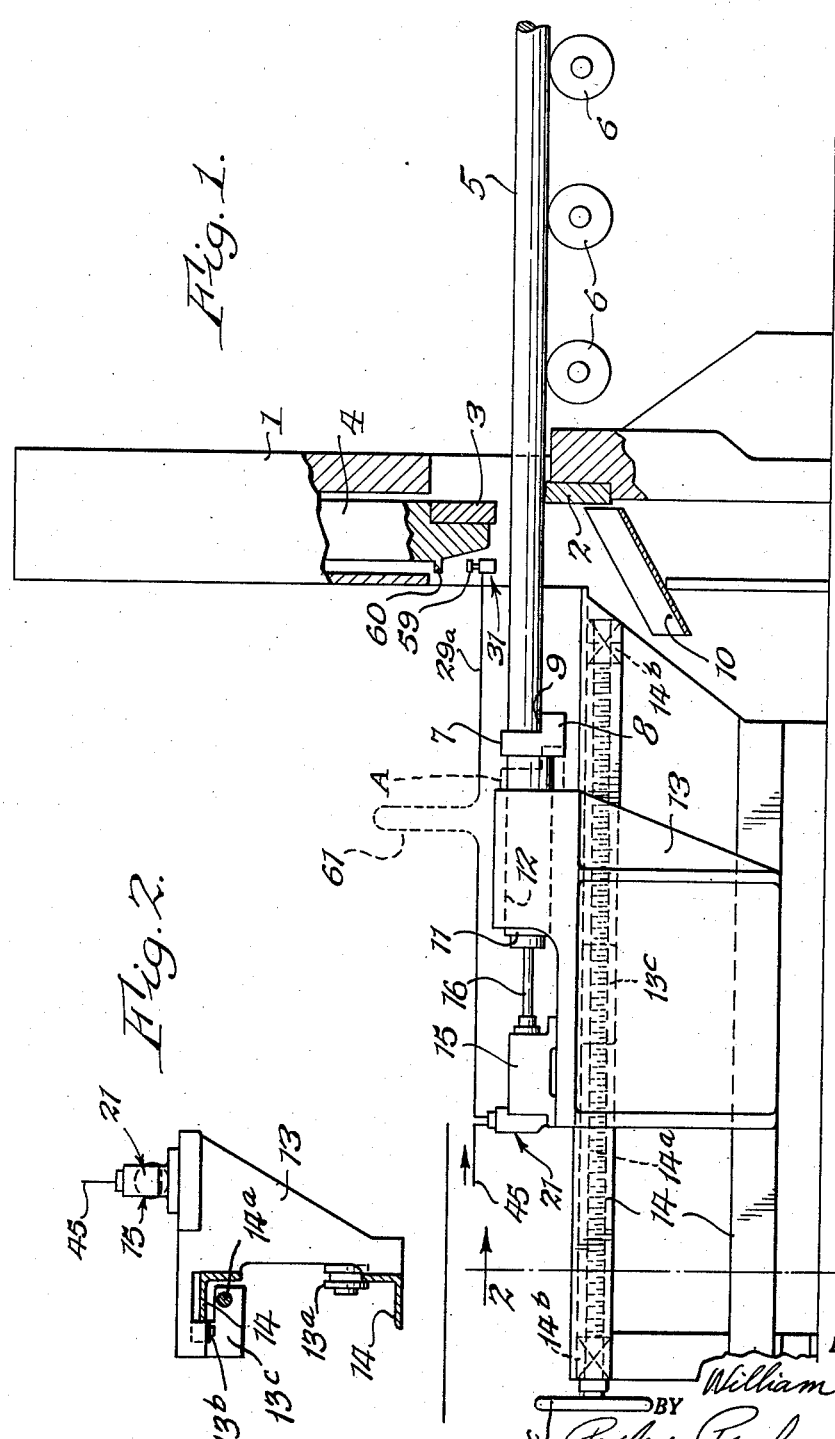

Patented July 27, 1948

2,446,146

UNITED STATES PATENT OFFICE 2,446,146

WORK GAUGE SUPPORT FOR SHEARS

William C. Tucker, Kenmore, N. Y., assignor to Buffalo Forge Company, Buffalo, N. Y.

Application March 23, 1945, Serial No. 584,435

12 Claims. (Cl. 164—59)

This invention relates to machines for cutting bar or rod stock into sections of selected lengths, and particularly to mechanism for selectively positioning the gage or stop which determines the uniform lengths into which the stock may be divided. One may desire to vary these lengths from time to time, so that the stop or gage head should be adjustable along the path of travel of the stock into different limiting positions. Heretofore these adjustable stops were merely abutments against which the free end of the stock engaged, and in the severing operation, the knives tended to flex the free end of the stock before the stock was completely severed, with resultant distortion of the stock at the end where the severance occurred.

An object of this invention is to provide an improved gage or limit stop for the rod or bar stock which is fed progressively between the knives; with which bending of the stock in the severing operation will be substantially prevented; with which distortion of the stock during a severing operation will be reduced to a minimum; with which the speed of operation need not be materially reduced; and which will be relatively simple, compact, accurate and efficient.

Another object of the invention is to provide an improved measuring means for a shearing or cutting machine; with which the stock may be cut or severed into sections of selected and variable lengths; with which distortion of the stock by the cutting or shearing operation will be prevented; with which the severed sections will be automatically and fully released at the conclusion of the severing operation; with which the gage or limit stop will be automatically replaced in limiting position; and which will require no additional supervision by the operator.

Other objects and advantages will be apparent from the following description of one embodiment of the invention, and the novel features will be particularly pointed out hereinafter in connection with the appended claims.

In the accompanying drawings:

Fig. 1 is a side elevation, with portions broken away, of limiting means constructed in accordance with this invention and applied to a bar cutter or billet shear;

Fig. 2 is a transverse, sectional elevation of the same, the section being taken approximately along the line 2—2 of Fig. 1;

Fig. 3 is a sectional elevation through a bleeder valve forming a part of the control;

Fig. 4 is a sectional elevation of the hydraulic motor for operating the gage or stop into and out of limiting position;

Fig. 5 is an elevation, partly in section, of the control valve for the fluid actuated motor that operates the stop or gage;

Fig. 6 is another sectional elevation through the control valve; and

Fig. 7 is a piping diagram that may be employed.

In the illustrated embodiment of the invention, the severing mechanism is illustrated rather diagrammatically as of the knife or shear type, which includes an upright frame 1 having a relatively fixed or lower knife 2, and an upper or relatively movable knife or cutter 3. This cutter 3 is carried by a vertically movable member 4 which moves back and forth to carry the knife 3 past the fixed knife 2 in the manner that the blades of a shear pass one another to shear or cut any stock that is disposed between them. Inasmuch as the shearing mechanism itself may be of any suitable or desired construction, it is shown only diagrammatically, and it will be understood that any mechanism for moving the holder 4 for the knife 3 may be employed. The stock, which may be in the nature of a bar or billet 5 is fed forwardly upon a suitable platform such as that provided by the feed rolls 6.

The stock 5, in moving forwardly on the rolls 6, will pass over the lower knife 2 until the free or advancing end of the stock engages a suitable stop or gage head 7. After the stock 5 has been stopped in this manner, the upper knife 3 is caused to approach and pass, in overlapping relation, the lower blade 2, during which operation the stock is sheared by these knives or blades 2 and 3. Since the upper knife 3 is of necessity slightly at one side of the lower knife 2, it exerts a bending force on the free or advance end of the stock which also tends to lift the following or uncut end of the stock. If the stock is held against tilting on the lower knife blade 2, then the stock will be bent or distorted adjacent that zone of the stock where the cutting or shearing occurs.

This distortion at the zone of severance often required special and additional machining operations on the severed section to restore the stock to its original cross section before other operations could be performed thereon. In accordance with this invention the gage head or stop 7 is disposed to engage against the advancing end face of the stock 5, to limit the movement of the stock between the knives 2 and 3, and in addition, this gage or head 7 also has a flange 8 providing a shelf or wall 9 that extends a short distance along the under side of the stock 5 at the same side of the stock as the fixed knife 2, that is, at the side or face of the stock which is opposite from that first engaged by the movable knife 3. With such an arrangement, when the movable knife begins to shear the stock, the turning moment or bending force on the advanced or free end of the stock will be resisted by the wall or shelf 9 with the result that the stock will be sheared without any bending of the stock, or distortion due to bending of the stock, adjacent the line of severance.

After the knife 3 completes its severing operation, it is retracted and held in retracted position until a new operation is initiated, and the severed stock piece then falls into or upon a chute or guide 10, by which it is conveyed away from the machine. It is desirable that this release of the severed section of the stock be complete in order that the severed section may fall freely upon the chute, and therefore the head or gage 7 is shifted in a manner and in a direction to remove the shelf 9 from beneath the advanced end of the stock.

While the head or gage 7 may be shifted sidewise or laterally of the path of movement of the stock in order to remove the wall or shelf 9 from engagement with the severed stock section, it is preferably shifted in a direction parallel to the direction of travel of the stock as it is fed into cutting position, such as into the dash line position A in Fig. 1, which automatically removes the wall or shelf 9 from beneath the severed stock section. After an opportunity has been given for the severed stock section to fall upon the chute 10, the gage or head 7 is returned to its effective, movement limiting position shown in full lines in Fig. 1.

While any suitable means may be employed for shifting this gate or head 7 into and out of its effective position within the broadest conception of the invention, a very satisfactory and preferred control thereof is through a fluid actuated motor 15. The gage or head 7 is carried by a plunger 11 which is mounted for reciprocation in a cylinder 12 on the upper part of a suitable carriage or support 13. This support is slidingly mounted on a suitable frame 14 for movement in a direction parallel to the direction of feed of the stock 5, so as to position the gage or stop 7 normally in the desired position to limit the advance of the stock 5. This mounting is shown in Fig. 2 in which the carriage 13 is provided with rollers 13a and 13b which roll against edges of angular members 14 in order that the carriage 13 may roll along the frame 14 toward and from the shear plates 2 and 3. Suitable means is provided for securing the support or carriage 13 in any of the different adjusted positions into which it may be moved on the frame 14. In the illustrated example the carriage 13 is provided with a nut 13c which extends under the upper frame member 14. A long screw 14a is mounted in bearings 14b in the ends of the frame 14 and it extends parallel to the direction of the travel of the carriage 13 and is threaded through the nut 13c. The outer end of the screw 14b is provided with a hand wheel 14c by which the screw may be turned, and since the screw is rotatably mounted in the bearings 14b and held thereby against endwise movement, the rotation of the screw will move the nut 13c, and through it the carriage along the frame 14.

The motor 15 is of the double-acting type and mounted on the carriage or support 13, and its working member 16 extends outwardly therefrom and is coupled to the plunger 11. Thus the motor 15 serves to retract the stop or gage 7 into the dash line position A of Fig. 1, which may be determined by engagement of the gage or stop with an end face of the cylinder 12 on carriage 13 or in any other manner, and to return it to its normal, limiting position, shown by full lines in Fig. 1, which may be determined by the engagement of the motor piston 17, Fig. 4, with the end of the cylinder in which it operates. The motor 15 includes a cylinder 18 in which the piston 17 reciprocates, and operating fluid is admitted through a pipe 19 to one end of the cylinder to cause a retraction of the stop, and to the opposite end of the cylinder through the pipe 20, to cause an advance or positioning of the stop.

The pipes 19 and 20, Figs. 4 to 6, are connected to a control valve 21 of any suitable type, but that illustrated is disclosed, for example, in my prior Patent #2,344,907 and in U. S. Patent No. 1,486,304 issued March 11, 1924, to C. A. Ross, to which reference may be had for a more complete disclosure. In the Ross patent, however, the rocker is manually operated, whereas, in the present example, the rocker 22 is pivoted at 23 to the housing of the valve and power operated by remote control. This power operation is obtained from a piston 24 operating in a cylinder 25. The piston 24 has a piston rod 26 extending out of the cylinder and having a universal connection 27 to one end of the rocker 22. The piston is operated in one direction by fluid pressure in one end of the cylinder 25, and that end of the cylinder is connected by a pipe 28 to an air supply pipe 29 having therein a bleeder port 30.

The pipe 29 is connected through the bleeder port 30 to a supply of operating fluid under pressure, such as compressed air. Section 29a of the pipe 29, at the same side of the bleeder port as the pipe 28, is connected to a bleeder valve 31, see Fig. 3. When the valve 31 is opened to vent that end of the pipe 29a, the pressure in pipe 28 and cylinder 25 will fall because the air escapes therefrom through valve 31 faster than it can pass through the port 30, and when that happens, the springs 32 in the valve 21 urge the rocker 22 counter-clockwise in Fig. 5 to depress the piston 24, which serves to change the condition of the valve 21 in a manner which will be explained presently. When valve 31 is closed, the pressure in pipe 28 and cylinder 25 will build up and force piston 24 upwardly in Fig. 5 to return the valve parts to the positions shown in Fig. 5.

The control valve 21 has four valve elements 33, 34, 35 and 36 which are all operated by the rocker 22. Each of the valve elements 33, 34, 35 and 36 is urged into closed position by a spring, similar to the spring 32 which operates the valve element 34 upwardly, but the springs operating the valve elements 33 and 34 are more powerful than those operating the valve elements 35 and 36 so that when the pressure on the piston 24 is released, the rocker 22 will be moved counter-clockwise in Fig. 5. The valve element 33 (Fig. 6) has a closure part 37 which controls a port 38 leading to an exhaust manifold 39. The valve element 34 has a closure portion 40 which controls a port 41 leading to a chamber 42 that is in continuous communication with the pipe 20. The valve element 35 (Fig. 5) has a closure portion 43 controlling a port 44 leading to the exhaust manifold 39. Air for operation of the motor is supplied through pipe 45 to a chamber 46 immediately below the closure part 40 of the valve element 36.

The closure part 49 controls the passage 50 which opens into a chamber 51 leading directly to the pipe 19. When the rocker 22 is in the position shown in Fig. 5, both valve elements 33 and 34 will be opened or depressed, and the valve elements 35 and 36 released so that they will be in closed positions. With the valve element 34 depressed into open position, operating fluid will enter valve 21 through pipe 45, pass through port 46, around closure part 40, through port 41 into the chamber 42, and then pass into pipe 20 which leads to one end of the cylinder 18. This forces the piston 17 forwardly and holds the gage head or limit stop in its position shown in full lines in Fig. 1 to be engaged by the stock as the latter is fed into position between the knives. Since the valve element 33 is also in its open position, the pipe 19, from the other end of the cylinder 18, will communicate, through the chamber 51, around closure part 37 and through port 38, with the exhaust manifold 39, so that the air displaced by the movement of the piston 17, in the manner just explained, can escape to exhaust.

If now the bleeder valve 31 is opened so as to vent pipe 29a, the pressure on piston 24 will be released, and the springs operating valve elements 33 and 34 will rock the rocker 22 counterclockwise in Fig. 5, with the result that valve elements 33 and 34 will move into closed positions, and valve elements 35 and 36 will be depressed into open positions. When valve element 33 closes it disconnects the pipe 19 from the exhaust manifold 39, and valve element 34 in closing cuts off the flow of fluid under pressure from the pipe 45 to the pipe 20. The movement of valve element 35 into the open position connects the chamber 42 to exhaust, so that pipe 20 is then connected directly to the exhaust manifold 39 through the port 44, and when the valve element 36 opens, it connects chamber 51 that is always in communication with pipe 19, to the passage 47 which is always connected through port 46 with the pipe 45 that supplies the operating fluid under pressure. This delivers fluid under pressure through pipe 19 to the opposite end of the cylinder 18 and vents pipe 20, with the result that the piston 17 moves to the left in Fig. 4, retracts the stop or gage head and disengages it from the end of the severed stock section which abuts against it.

Any suitable bleeder valve 31 may be employed, but in the example illustrated in Fig. 3, the pipe 29a opens into a chamber 52, and this chamber, in turn, is connected through a port 53 to an exhaust opening or port 54. A valve element 55 is urged resiliently into sealing position over the port 53 by a spring 56, so that pressure from pipe 29a will supplement the spring 56 to keep the port 53 normally closed. A rod 57 is mounted in the housing of the valve, in endwise alinement with port 53, for endwise movement toward and from the valve element 55. A spring 58 acting between a head 59 on the rod 57 and a wall of the housing of valve 31, serves to normally keep the rod 57 elevated and out of contact with the valve element 55. If the head 59 is depressed against the action of spring 58, the lower or inner end of the rod 57 will engage the valve element 55 and open it against the action of the spring 56, which vents that end of the pipe 29a and keeps it vented so long as the head 59 is depressed. When pressure on the head 59 is released, spring 58 will return rod 57 to its elevated position, and spring 56 will reseat valve element 55 across the port 53 so as to again close that adjacent end of the pipe 29a.

The bleeder valve 31 is mounted on the cutter frame 1 in a position for the head 59 to be engaged and depressed by a lug 60 carried by the operating member 4 that moves with the upper or movable knife 3, to vent that end of the pipe 29a when the knife 3 has approximately begun to overrun the knife 2. This would be after the free end of the stock has been nearly or entirely severed. There may be some time delay after the venting of the pipe 29a before the piston 17 is operated to retract the gage 7, which may make it possible for the valve 31 to be operated slightly before the severing operation is completed. Thus the gage head or stop 7 will be retracted to release the free end of the stock after the free end of the stock has been severed, so that this severed stock section can fall upon the chute 10 and be conveyed away. During return or retraction of the movable knife 3 the valve 31 will be released and that end of the pipe 29a again closed, with the result that pressure will again be returned to the pipe 20 to cause an advance or return of the gage head or stop 7 to its forward position where it limits the feeding movement of the stock 5.

The pipe 29a between the valve 31 and the control valve 21 is provided with a doubled or loop section 61, as shown in Fig. 1, which is made of flexible pipe or conduit, so that the support 13 may be adjusted bodily along the frame 14 to properly position the gage head or stop 7, without interrupting the connection between the bleeder valve 31 and the control valve 21. The pipe 29, below the bleeder port 30, is connected to the fluid pressure supply pipe 45.

It is believed that the operation of the device will be apparent from the foregoing description, but will be briefly summarized. With the parts arranged in the positions shown in full lines in the drawings, the stock 5 is fed forwardly between the knives 2 and 3 until it engages against the gage head or stop 7, at which time the free or advance end of the stock has overrun slightly with the wall 9 of flange 8, which is at the opposite side of the stock from the movable knife 3. It is understood that before this occurs, the support 13 will be shifted on the frame 14 into a position in which the stop 7, when advanced, will limit the feeding movement of the stock 5 between the knives 2 and 3 to such a position that when the stock is severed by the shearing action of the knives 2 and 3, the severed section will have the desired, predetermined length.

The operator then initiates an operation of the cutter or shearing device, as usual in that type of machine, during which the knife head 4 descends, carrying movable knife 3 towards, and then slightly passing the lower or stationary knife 2. This severs the free end of the stock 5, and during that operation the turning force exerted on the free end of the stock by the upper knife 3 which tends to bend the free end of the stock downwardly in Fig. 1, is opposed by the flange 8 of the stop. Consequently, there will be a minimum of bending of the stock 5 and hence of distortion of the severed stock. When the severing operation has been approximately completed, the lug 60 will engage and depress the head 59 of bleeder valve 31, which vents the adjacent end of pipe 29a and thus releases pressure on piston 24. The valve 21 then disconnects the operating fluid received through pipe 45 from the pipe 20, connects it instead to the pipe 19, and vents the pipe 20.

This causes a retraction of the gage head or stop 7 through motor 15. This retraction is sufficient to release the advance end of the severed section of the stop, and the severed section can then fall upon the chute 10. As the knife 3 moves upwardly, the bleeder valve 31 will be released so as to close that end of the pipe 29a, and thereupon pressure on piston 24 will be resumed, and the valve 21 operated to vent pipe 19 and restore pressure to the pipe 20, which causes a return of the stop 7 to its advanced or stop position shown in full lines in Fig. 1, ready to receive an end of the stock 5 as the latter is fed forwardly between the knives.

It will be understood that various changes in the details and arrangements of parts, which have been herein described and illustrated in order to explain the nature of the invention, may be made by those skilled in the art within the principle and scope of the invention as expressed in the appended claims.

I claim:

1. In a shear or cutter for bar or rod stock of the type having relatively movable shearing knives between which the bar or rod stock is fed for severing into selected lengths, that improvement for stopping the stock in proper severing position which comprises an end stop normally disposed in the path of movement of the stock in position to be abutted by the end of the stock after said stock has been fed between the knives to the selected extent, said stop having a shoulder extending approximately at a right angle to said stop a short distance along that side of the adjacent stock end opposite from the movable knife and positively held at all times against movement in the direction of movement of the movable shearing knife to prevent flexing of the adjacent stock end during the severance by the knife movement, said stop with its shoulder being shiftable only in the general direction of feed of said stock to release the severed stock end and then back to stopping position, and means for shifting said stop to release a severed end after said severing operation.

2. In a shear or cutter for bar or rod stock of the type having relatively movable shearing knives between which the bar or rod stock is fed for severing into selected lengths, that improvement for stopping the stock in proper severing position which comprises an end stop normally disposed in the path of movement of the stock in position to be abutted by the end of the stock after said stock has been fed between the knives to the selected extent, said stop having a shoulder extending approximately at a right angle to said stop a short distance along that side of the adjacent stock end opposite from the movable knife and positively held at all times against movement in the direction of movement of the movable shearing knife to prevent flexing of the adjacent stock end during the severance by the knife movement, said stop with its shoulder being shiftable out of stopping position mainly in the direction of feed of the stock to release the severed stock end and then back to stopping position, and means controlled by the relative movement of the knives after a severing operation has been performed for shifting said stop out of stopping position to release the severed stock, and then back into stopping position during return of the knives to separated position.

3. In a shear or cutter for bar or rod stock of the type having relatively movable shearing knives between which the bar or rod stock is fed for severing into selected lengths, that improvement for stopping the stock in proper severing position which comprises a stop normally disposed in the path of movement of the stock for engagement by the end of the stock after said stock has been fed between the knives to the selected extent, said stop having a shoulder extending a short distance along that side of the adjacent stock end opposite from the movable knife to prevent flexing of the adjacent stock end during the severance by the knife movement, said stop being shiftable out of stopping position to release the severed stock end and then back to stopping position, fluid actuated means for shifting said stop out of stopping position, and means controlled by the knives for rendering said fluid actuated means effective for shifting said stop out of stopping position at the completion of the severing operation of said knives and for causing the return of said stop to stopping position during the return of the knives to normal positions.

4. In a shear or cutter for bar or rod stock of the type having relatively movable shearing knives between which the bar or rod stock is fed for severing into selected lengths, that improvement for stopping the stock in proper severing position which comprises a stop normally disposed in the path of movement of the stock in position to be abutted by the end of the stock after said stock has been fed between the knives to the selected extent, said stop having a shoulder extending approximately at a right angle to said stop a short distance along that side of the adjacent stock end opposite from the movable knife and positively held at all times against movement in the direction of movement of the movable shearing knife to prevent flexing of the adjacent stock end during the severance by the knife movement, a support shiftable only in the direction of feed of said stock, and means carried by said support, mounting said stop, and operable while said support remains relatively stationary for independently shifting said stop relatively to said support in the direction of feed of the stock and bodily out of engagement with an abutting end portion of the stock in a direction approximately parallel to the direction of feed of the stock, whereby after a severing operation, said stop may be shifted in a direction parallel to the direction of feed of the stock to release the severed stock end and then returned to a position to stop the stock moving into severing position.

5. In a shear or cutter for bar or rod stock of the type having relatively movable shearing knives between which the bar or rod stock is fed for severing into selected lengths, that improvement for stopping the stock in proper severing position which comprises a stop normally disposed in the path of movement of the stock for engagement by the end of the stock after said stock has been fed between the knives to the selected extent, said stop having a shoulder extending a short distance along that side of the adjacent stock end opposite from the movable knife to prevent flexing of the adjacent stock end during the severance by the knife movement, a support shiftable in the direction of feed of said stock and mounting said stop for bodily movement therewith into and out of a position in which the stop will stop feeding of the stock in the proper position for severance, and fluid actuated means on said support and operable to shift said stop on said support out of engagement with the abutting end of said stock so as to release a severed stock end and then return it to limiting position for the stock as the latter moves into position for severance.

6. In a shear or cutter for bar or rod stock of the type having relatively movable shearing knives between which the bar or rod stock is fed for severing into selected lengths, that improvement for stopping the stock in proper severing position which comprises a stop normally disposed in the path of movement of the stock for engagement by the end of the stock after said stock has been fed between the knives to the selected extent, said stop having a shoulder extending a short distance along that side of the adjacent stock end opposite from the movable knife to prevent flexing of the adjacent stock end during the severance by the knife movement, a support shiftable in the direction of feed of said stock and mounting said stop for bodily movement therewith into and out of a position in which the stop will stop feeding of the stock in the proper position for severance, fluid actuated means on said support and operable to shift said stop on said support out of engagement with the abutting end of said stock so as to release a severed stock end and then return it to limiting position for the stock as the latter moves into position for severance, and means rendered effective by the relative movement of the knives for causing said fluid actuated means to move said stop out of engagement with the severed stock end at approximately the end of a severing operation, and for causing the return of the stop to stopping position during the return of the knives to initial positions.

7. In a shear or cutter for bar or rod stock of the type having relatively movable shearing knives between which the bar or rod stock is fed for severing into selected lengths, that improvement for stopping the stock in proper severing position which comprises a stop normally disposed in the path of movement of the stock for engagement by the end of the stock after said stock has been fed between the knives to the selected extent, said stop having a shoulder extending a short distance along that side of the adjacent stock end opposite from the movable knife to prevent flexing of the adjacent stock end during the severance by the knife movement, a support mounted for movement in a direction parallel to the axis of movement of said stock as the stock moves into severing position, means for securing said support in different positions of such movement, a fluid actuated motor on said support having a working member movable back and forth in a direction parallel to the axis of movement of said stock, a gage head connected to the working member and receiving and holding the free end of said stock when the stock is in proper severing position and limiting sidewise movement of the free end of the stock during its severing operation, and means controlled by said knives for operating said motor to normally hold said gage head in its advanced holding position, but operable to retract said head and release the severed stock end after a severing operation.

8. In a shear or cutter for bar or rod stock of the type having relatively movable shearing knives between which the bar or rod stock is fed for severing into selected lengths, that improvement for stopping the stock in proper severing position which comprises a stop normally disposed in the path of movement of the stock for engagement by the end of the stock after said stock has been fed between the knives to the selected extent, said stop having a shoulder extending a short distance along that side of the adjacent stock end opposite from the movable knife to prevent flexing of the adjacent stock end during the severance by the knife movement, a support mounted for movement in a direction parallel to the axis of movement of said stock as the stock moves into severing position, means for securing said support in different positions of such movement, a fluid actuated motor on said support having a working member movable back and forth in a direction parallel to the axis of movement of said stock, a gage head connected to the working member and receiving and holding the free end of said stock when the stock is in proper severing position and limiting sidewise movement of the free end of the stock during its severing operation, and controlling means for said motor having a control element disposed in a position for engagement by the relatively moving knife during a severing operation for causing the retraction of said head to release the severed stock section, and for returning the gage head to stopping position during the return relative movement of the knife.

9. In a shear or cutter for bar or rod stock of the type having relatively moving shearing knives between which the stock is fed for severance into selected lengths, that improvement for stopping the stock in the proper severing position which comprises a gage head disposed for engagement by the end of the stock as it reaches the desired position for severance so as to thereby determine the length of the section to be severed, said gage head having a flange extending along that side of the free end of the stock towards which the movable knife moves in the severing operation, so as to prevent bending of the free end of the stock during a severing operation, a piston mounting said head for movement in the direction of feed of the stock and contra, and fluid actuated means for moving said piston and head in the direction of feed of the stock to release a severed stock end and then back into its former stopping position.

10. In a shear or cutter for bar or rod stock of the type having relatively moving shearing knives between which the stock is fed for severance into selected lengths, that improvement for stopping the stock in the proper severing position which comprises a gage head disposed in position to be abutted by the end of the stock as it reaches the desired position for severance so as to thereby determine the length of the section to be severed, said gage head having a flange extending along that side of the free end of the stock towards which the movable knife moves in the severing operation, said gage head and flange being positively held at all times against movement in the direction of movement of the movable shearing knife so as to prevent bending of the free end of the stock during a severing operation, and means for shifting said gage head with its shoulder bodily out of stopping position mainly in the direction of feed of the stock to release the severed end of the stock at approximately the end of the severing operation, and for returning the head to stopping position before a new severing operation begins.

11. In a shear or cutter for bar or rod stock of the type having relatively moving shearing knives between which the stock is fed for severance into selected lengths, that improvement for stopping the stock in the proper severing position which comprises a gage head disposed in position to be abutted by the end of the stock as it reaches the desired position for severance so as to thereby determine the length of the section to be severed, said gage head having a flange extending along that side of the free end of the stock towards which the movable knife moves in the severing operation, said gage head and flange being positively held at all times against movement in the direction of movement of the movable shearing knife so as to prevent bending of the free end of the stock during a severing operation, and means having a control element rendered effective by relative movement of said knives at approximately the end of a severing operation for shifting said head with its shoulder bodily out of stopping position only in a direction substantially perpendicular to the direction of movement of said movable knife to release the severed end of the stock, and for returning the head to stopping position before a new severing operation begins.

12. In a shear or cutter for bar or rod stock of the type having relatively moving shearing knives between which the stock is fed for severance into selected lengths, that improvement for stopping the stock in the proper severing position which comprises a gage head disposed in position to be abutted by the end of the stock as it reaches the desired position for severance so as to thereby determine the length of the section to be severed, said gage head having a flange extending along that side of the free end of the stock towards which the movable knife moves in the severing operation, so as to prevent bending of the free end of the stock during a severing operation, and an element mounting said head and movable in either direction only along the line of feed to position the head to stop the moving stock at any of a plurality of different positions, said mounting guiding said head in a separate, limited movement relatively to said element, but in the same directions to enable limited movement of the head on said element in said direction of feed of the stock away from its stopping position to release a severed end of the stock, and then back to its stopping position.

WILLIAM C. TUCKER.

REFERENCES CITED

The following references are of record in the file of this patent:

UNITED STATES PATENTS

| Number | Name | Date |
| --- | --- | --- |
| 345,359 | Boehme | July 13, 1886 |
| 1,141,644 | McDonald | June 1, 1915 |
| 1,169,333 | McDonald | Jan. 25, 1916 |
| 1,174,747 | McDonald | Mar. 7, 1916 |
| 1,690,503 | Rhodes | Nov. 6, 1928 |
| 1,979,413 | Seft | Nov. 6, 1934 |
| 2,204,405 | Dunlap | June 11, 1940 |

FOREIGN PATENTS

| Number | Country | Date |
| --- | --- | --- |
| 399,923 | Germany | Aug. 13, 1924 |
| 419,111 | Germany | Sept. 19, 1925 |